Figure 1:
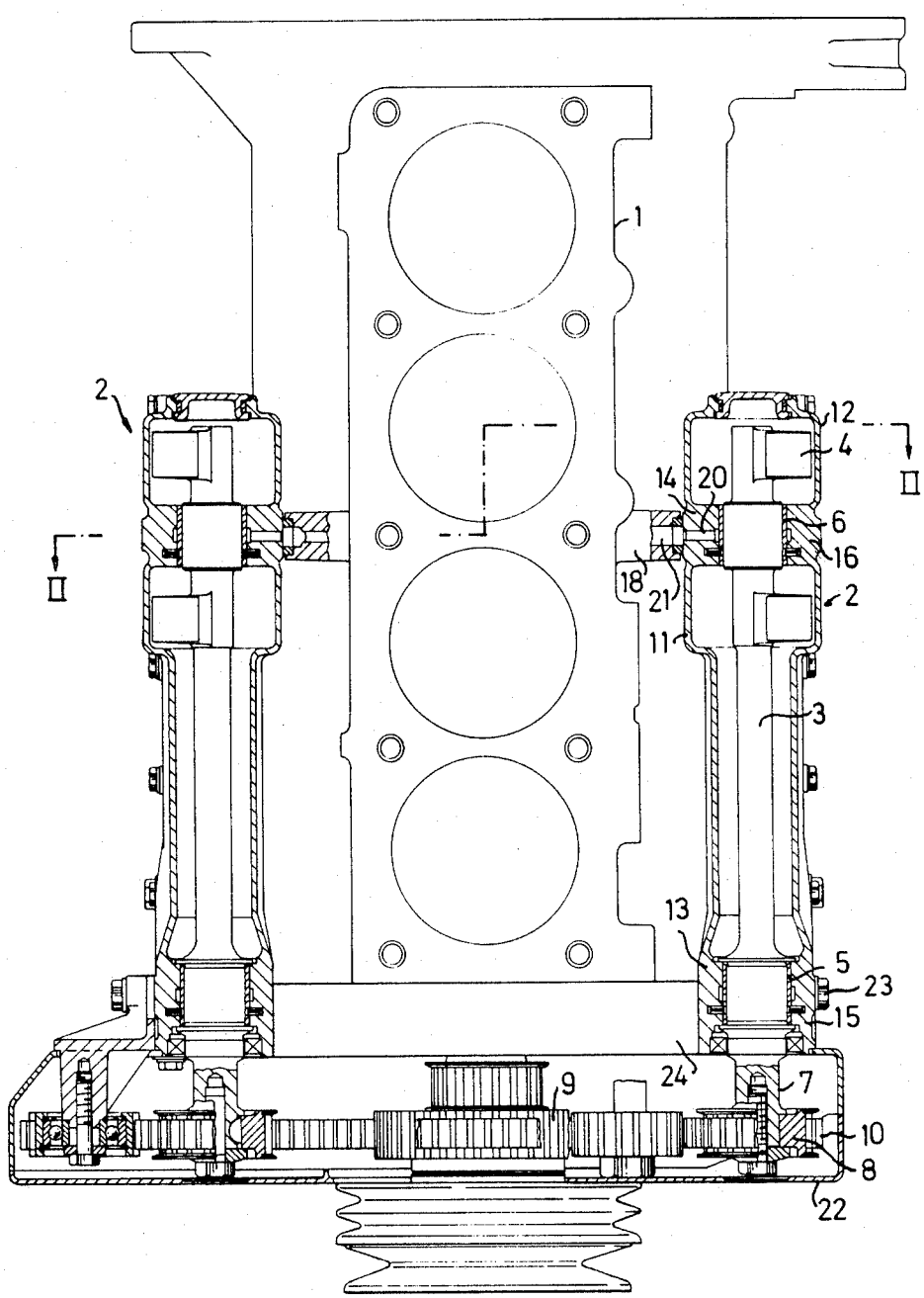

United States Patent [19]

Backlund

[11] Patent Number: 4,523,553
[45] Date of Patent: Jun. 18, 1985

[54] COMBUSTION ENGINE WITH BALANCING DEVICE

[75] Inventor: Ove Backlund, Västra Frölunda, Sweden

[73] Assignee: AB Volvo, Goteborg, Sweden

[21] Appl. No.: 388,714

[22] Filed: Jun. 15, 1982

[30] Foreign Application Priority Data

Jun. 17, 1981 [SE] Sweden .................................. 8103814

[51] Int. Cl.³ .............................................. F16F 15/14
[52] U.S. Cl. ............................ 123/192 B; 123/195 H; 74/604
[58] Field of Search ............ 123/192 B, 192 R, 195 A, 123/195 S, 195 H; 74/604, 603

[56] References Cited

U.S. PATENT DOCUMENTS 3,888,226  6/1975  Wallace ........................... 123/195 A
4,290,395  9/1981  Sakano et al. ................... 123/192 B

FOREIGN PATENT DOCUMENTS 330717   12/1933  Fed. Rep. of Germany.
2253605   5/1974  Fed. Rep. of Germany ... 123/192 B
2456841   1/1981  France ........................... 123/192 B Primary Examiner—Ira S. Lazarus
Assistant Examiner—R. S. Bailey
Attorney, Agent, or Firm—Young & Thompson

[57] ABSTRACT

A combustion engine has at least one balancer shaft, driven by the engine and arranged parallel to the crankshaft, to dampen engine vibrations. The balancer shaft is arranged in a separate housing, mounted on the outside of the cylinder block, to make it possible, with only minor modifications, to equip existing older engine types with balancer shafts. The housing has at least two axially-spaced bearings for the balancer shaft and is attached directly to the engine block by means of fasteners located in the area of those bearings.

3 Claims, 5 Drawing Figures

COMBUSTION ENGINE WITH BALANCING DEVICE

The present invention relates to a combustion engine of piston type with at least one balancer shaft driven by the engine and arranged parallel to the crankshaft.

It is known that the level of vibration of an engine can be reduced if the engine is equipped with one or more rotating shafts provided with suitable unbalanced weights. In engine designs known up to now with balancer shafts, the shafts have been completely or partially mounted in the cylinder block, which requires specially designed cylinder blocks.

The purpose of the present invention is generally to achieve a solution which makes it possible with only minor modifications to equip existing engines with balancer shafts, i.e. engines with cylinder blocks which were not previously specially designed for the use of balancer shafts.

This is achieved according to the invention by mounting the balancer shaft in a separate housing mounted on the outside of the cylinder block.

The advantage of this solution is that it provides the possibility of modernizing older types of engines without substantial reconstruction of the existing transfer line. It will essentially suffice to have separate manufacture and mounting of the balancer shaft housings. An additional advantage is that even if only a portion of the various engines in a so-called engine family are to be provided with balancer shafts, the processing and assembly stations need not be dimensioned for the same tempo as for the entire production. Rather, the required number of balancer shafts and housings can be made on a smaller side line.

In a preferred embodiment of the engine according to the invention, the balancer shaft housing is screwed onto the cylinder block, the balancer shaft housing also having, with the block, a shape-defined engagement transverse to the screw joint, preferably in the form of engaging depressions and projections on the block and housing. In this way, the balancer housing can be joined to the engine block without using large screw dimensions to absorb the dynamic forces from the balancer shaft.

The invention will be described in more detail below with reference to embodiments shown in the accompanying drawings.

Figure 2:
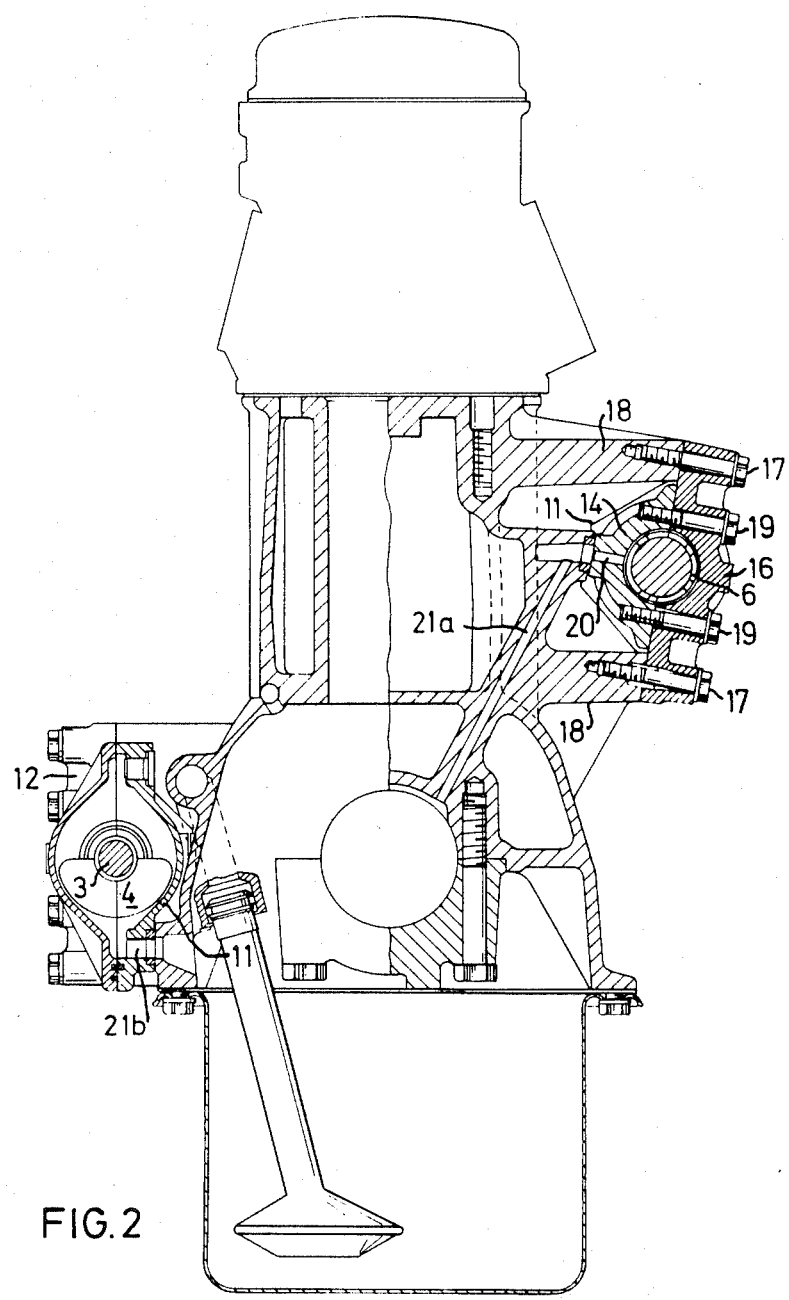
Figure 3:
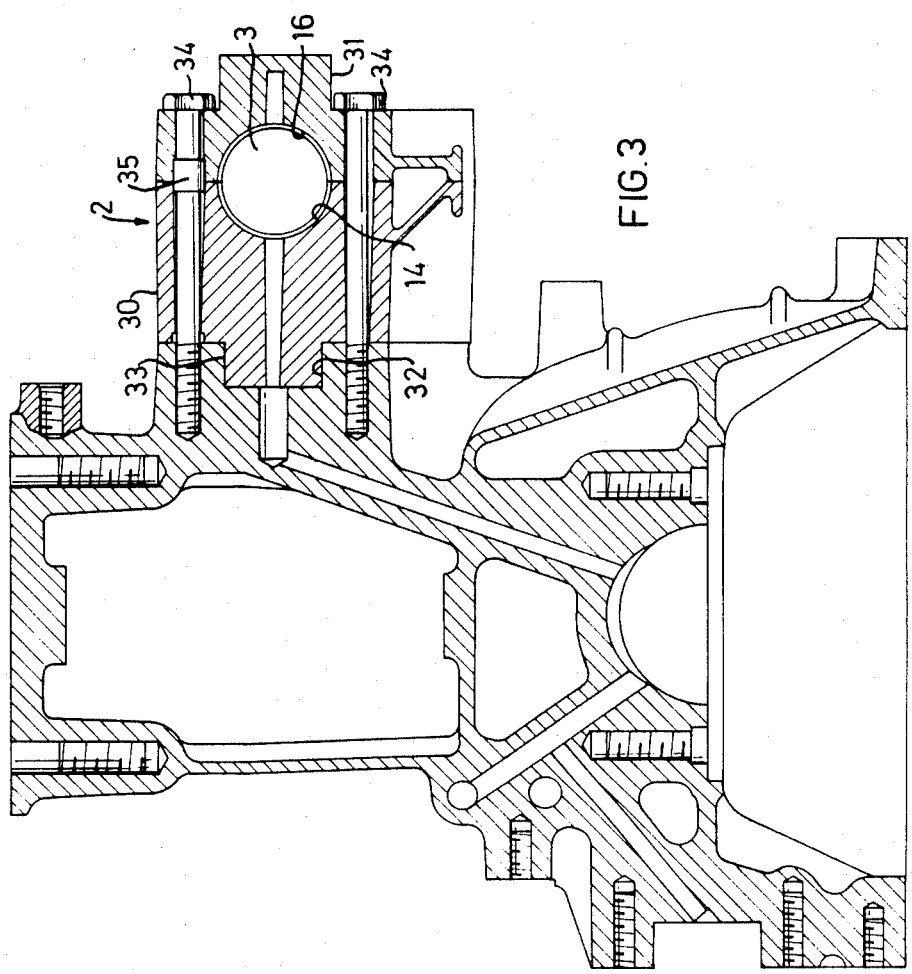
Figure 4:
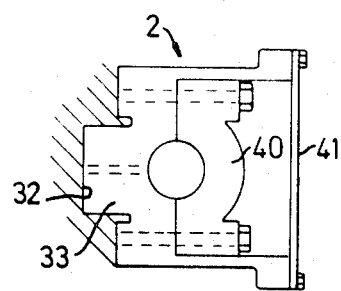
Figure 5:
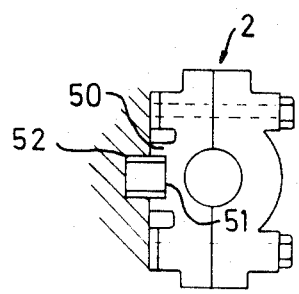

FIG. 1 is a partially sectional planar view of a cylinder block with double balancer shafts, FIG. 2 is a cross section along the line II—II in FIG. 1, FIG. 3 is a cross section through a cylinder block with double balancer shafts in a modified embodiment, and FIGS. 4 and 5 are schematic cross sections through two additional embodiments of the balancer shaft housing.

In FIGS. 1 and 2, 1 designates the cylinder block of a straight four-cylinder engine. On either side of the cylinder block 1, a balancer shaft housing 2 is mounted in which a balancer shaft 3 with unbalanced weights 4 is rotatably mounted in a forward bearing 5 and a rear bearing 6. Each balancer shaft 3 has a shaft end 7 extending through the housing 2 and carrying a cogged belt gear 8 which is driven via a cogged belt 10 by a cogged belt gear 9 driven by the engine crankshaft.

As most clearly revealed in FIG. 2, the balancer shaft housing consists of an inner housing portion 11 and an outer cover portion 12 which have, in one piece therewith, bearing halves 13, 14 and bearing caps 15, 16 respectively for the bearings 5, 6. At its rear portion, the balancer shaft housing 2 is fixed to the cylinder block 1 with screws 17 which extend through the bearing cap 16 in the cover 12 and are screwed into projections or bosses 18 on the block between the second and third cylinders. The housing portion 11 and the cover portion 12 are held together by screws 19 which extend through the bearing cap 16 and are screwed into the bearing half 14 in the housing 11. This presses a surface of the housing 11 from which an oil duct 20 leads to the bearing 6 against a surface of the block in which an oil duct 21 opens which communicates with the ordinary engine lubricating system. At its forward portion, the balancer shaft housing 2 is fixed to the cylinder block 1 with screws 23 which extend through the bearing cap 15 in the cover 12 and the inner housing portion 11 and are screwed into bosses or projections on the cylinder block. At its forward end, the balancer shaft housing 2 is integrated with a casing 22 which encloses the cogged belt transmission.

FIG. 3 shows a cylinder block 1 with a balancer shaft housing 2 in a somewhat modified embodiment, in which the housing consists of an inner housing portion 30 and an outer cover portion 31. The cylinder block is made with a cavity or depression 32 into which a projection 33 on the housing portion 30 extends. The housing portion 30 and the cover 31 are held together by screws 34 which are screwed into the block and at the same time serve as fixing screws for the balancer shaft housing as a whole. By thus establishing a vertically shape-defined engagement between the cylinder block and the balancer shaft housing, the advantage is achieved over the frictional joint in the preceding embodiment in FIGS. 1 and 2 that the screws 34 of the screw joint only need to be dimensioned for the normal forces in the joint. Thus the possibility of sliding, which exists in a mere frictional joint, can be disregarded. This means that the screws 34 can be dimensioned for an appreciably lower force than the screws 17 in the embodiment according to FIGS. 1 and 2.

FIG. 4 shows an embodiment of a balancer shaft housing 2 which, as in the preceding, has a shape-defined engagement with the block by means of interacting depressions 32 and projections 33, but which has separate bearing caps 40 and a separate cover 41 in the form of a flat plate.

Finally FIG. 5 shows an embodiment in which the balancer shaft housing 2 has a housing portion 50 with a cavity 51, the shape-defined engagement being established with the aid of a locking member in the form of a lock ring 52 which projects into a cavity in the block and into a cavity 51 in the housing portion 50.

The invention has been described in the preceding with reference to a straight four-cylinder engine with double balancer shafts, one of which is placed level with the crankshaft and the other at a higher level, the former rotating counter to the rotational direction of the crankshaft and the latter rotating in the same direction as the crankshaft. The invention can of course be applied to other types of engines with other numbers of cylinders and having one or more balancer shafts. The position relative to the crankshaft can also be varied.

What I claim is:

1. In a combustion engine of the piston type having an engine block and a crankshaft and at least one balancer shaft driven by the engine and arranged parallel to the crankshaft; the improvement comprising a separate housing in which the balancer shaft is mounted, the housing containing at least two axially-spaced bearings for the balancer shaft, and screws directly attaching the housing to the engine block at spaced locations adjacent said bearings, the cylinder block and the housing having a projection on one that extends into a mating recess on the other in a direction parallel to the screws and transverse to the balancer shaft.

2. Combustion engine according to claim 1, characterized in that the balancer shaft housing has lubrication ducts which open into the side of the housing facing the cylinder block and communicate with the engine lubricating system via lubrication ducts opening at the side of the cylinder block facing the balancer shaft housing.

3. Combustion engine according to claim 1, said housing being elongated in the direction of the length of said at least one balancer shaft, said screws having the same spacing axially of the balancer shaft as said bearings and being in radial alignment with said bearings.

* * * * *